July 27, 1943.   W. E. AMBERG   2,325,460
CONSTANT VELOCITY UNIVERSAL JOINT
Filed Sept. 20, 1940
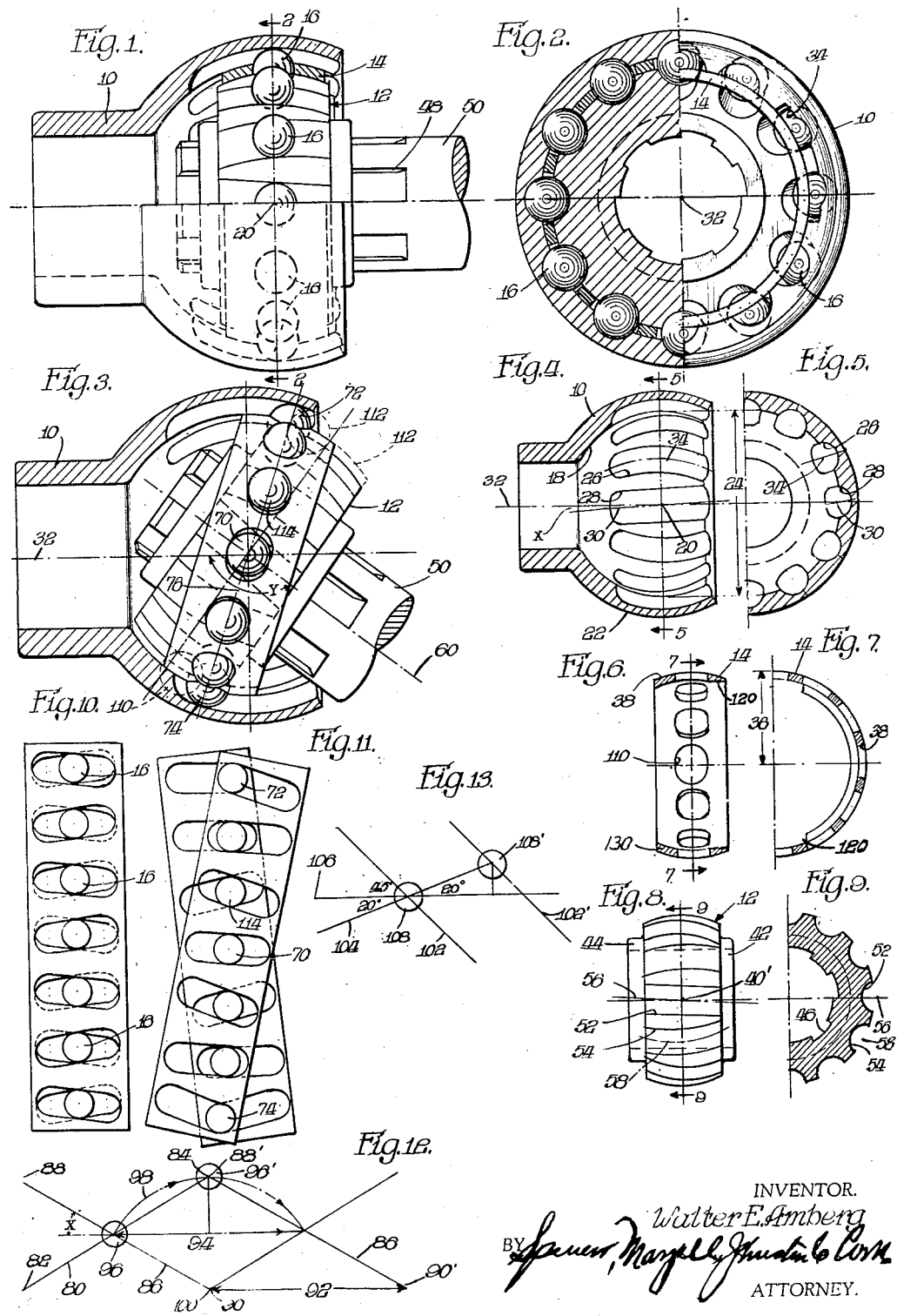
INVENTOR.
Walter E. Amberg
BY
ATTORNEY.

Patented July 27, 1943

2,325,460

UNITED STATES PATENT OFFICE 2,325,460

CONSTANT VELOCITY UNIVERSAL JOINT

Walter E. Amberg, Beverly Shores, Ind.

Application September 20, 1940, Serial No. 357,547

5 Claims. (Cl. 64—21)

This invention relates to a constant velocity universal joint, and in particular relates to a constant velocity universal joint of the ball and socket type, wherein are incorporated certain principles disclosed in applicant's co-pending application Serial No. 245,805, filed December 15, 1938, now Patent No. 2,286,182, June 16, 1942.

In the application above mentioned, there is disclosed a universal joint wherein the driving elements between the driving member and the driven member are positively held at a point which bisects the angle between the driving member and the driven member. It might be mentioned here parenthetically that it is well known to those acquainted with the art that in order to provide a constant velocity universal joint between shafts disposed at an angle to one another, it is necessary to provide an intermediate revoluble driving member which bisects the angle between the driving and driven members. It has long been recognized that centrifugal force will tend to cause any intermediate revoluble member to occupy such a bisecting position after a certain speed of rotation has been attained, but this fact has not deterred the development of a great many so-called "self-equalizing" intermediate revoluble members for universal joints, which self-equalizers have a positive action on the intermediate revoluble member regardless of the speed of rotation.

In the structure shown in applicant's co-pending application, an intermediate revoluble member comprising four balls and a raceway is disposed between a plurality of complementary pairs of raceways, the raceways of each pair being disposed upon curved ends of the driving member and the driven member. Each raceway lies in a plane which includes the axis of the member upon which the raceway is disposed, and each raceway has an axis which curves along the circumference of a circle generated from a center lying in the axis of the member upon which the raceway is disposed. The function of applicant's copending constant velocity universal joint may be described as an intermediate revoluble member, self-equalizing by ball-point contact, wherein the balls utilize an external raceway held in assembled relationship by the balls themselves, and which external raceway causes the balls to "breathe" properly during a rotational movement.

The invention disclosed in applicant's co-pending application may be broadly viewed from another standpoint. It may be said that applicant has positioned a driving member and a driven member in end-to-end relationship and has then provided a plurality of balls which move in an orbit which bisets the angle between the driving and driven members, the orbit of the balls being determined by three-point engagement of each ball, the three points being a point on the driven member, a point on the driving member, and a point on the retaining raceway. What applicant accomplished was the use of a plurality of balls positively held in an orbit so as to constitute an intermediate revoluble member, and, as will be seen in the disclosure that follows, this conception of a plurality of balls positively held in an orbit having a given plane is carried into the present application, although the two structures look wholly unlike. Moreover, applicant carries into the present application a ball-guiding sleeve which performs functions quite similar to the retaining raceway in applicant's co-pending application, although in the latter case the raceway holds the balls against centrifugal force, whereas in the present case the ball-guiding sleeve holds the balls from escaping from the plane of the orbit along a line somewhat parallel to the axis of the driving or driven member.

The advantages of the constant velocity universal joint shown in applicant's co-pending application include the positive positioning of the intermediate revoluble member regardless of the rate of rotation of the joint; the fact that the raceways are positioned on surfaces which may be readily machined so that the joint may be produced at a comparatively small cost; and, finally, the fact that the keying members are not in a supporting relationship, except as to the retaining raceway, but exist for the sole purpose of communicating torque from the driving member to the driven member.

Accordingly, in the present invention applicant desires to provide a ball and socket constant velocity universal joint which will have certain advantages from the standpoint of assembly and which will nevertheless incorporate the functional features of applicant's invention shown in the copending application. Another object is to support the ball and socket members upon each other in such a fashion that the driving keys which are ball bearings, need perform no function other than the transmission of torque. Another object of this invention is to position the raceways which will control the driving ball bearings so as to hold them in an orbit always lying in a single plane so that the raceways may be easily machined on the ball and socket members with a minimum cost. This objective is very important commercially because constant velocity universal joints having self-equalizing intermediate revoluble members have been known in the prior art, but their complexity has been such that they could not be produced at a cost sufficiently low to warrant their use even on the more expensive automobiles.

Another object of this invention is to provide a new and novel method for holding a ball and socket joint in assembled relationship with the highly desirable result that the joint is in no way dependent upon the position of driving and driven shafts or of any other external means for holding it in assembled relationship. Several other objects of this invention, together with the features that make it possible to attain these objects, will be discussed at a later point because their position relative to the invention as a whole can best be perceived and the nature of their function can best be understood after an examination of one embodiment of the invention which is shown in the drawing, wherein:

Figure 1 shows a side view of the full assembled joint mounted on a spline drive shaft. In this view a half section of the outer housing or socket member and half section of the ball member is removed;

Figure 2 is an end view of Figure 1 with the spline shaft removed. In this view half is shown full end view and half is shown as an end view section through the center line 2—2 of Figure 1;

Figure 3 is a side view of a full assembled joint in an angular drive position. In this view the socket member is shown in center line section;

Figure 4 is a center line section side view of the socket member;

Figure 5 is a sectional view on line 5—5 of Figure 4;

Figure 6 is a center line section side view of the ball-guiding sleeve;

Figure 7 is a sectional view on center line 7—7 of Figure 6;

Figure 8 is a side view of the ball member;

Figure 9 is a half section view on the center line 9—9 of Figure 8;

Figures 10 and 11 are diagrammatic views showing relative positions of balls and grooves under universal movement when in a plane. Figure 10 shows relative position of balls and grooves when the joint is not angled as in Figure 1 and Figure 11 shows the relative position of balls and grooves when the joint is angled as in Figure 3;

Figure 12 is a diagrammatic view showing the movement of the balls along raceways reversely angled equally to an axis; and Figure 13 is a diagrammatic view of the movement of the balls along reversely angled raceways, the angles of the raceways to an axis not being equal.

Continuing to refer to the drawing, a constant velocity universal joint is seen to comprise three members and a set of balls; namely, a socket 10, a ball 12, a ball-guiding sleeve 14, and a plurality of balls 16. Describing the socket, and referring to Figures 4 and 5, the socket is seen to have an interior wall 18 comprising a portion of a sphere having a center 20. The outer face 22 of the socket has an inside diameter 24 which is greater than the outside diameter of the ball member 12 shown in Figure 8, and necessarily greater than the outside diameter of the ball-guiding sleeve 14, see Figure 6. Returning to Figure 4, raceways such as 26 and 28 are scooped from the inner spherical surface 18 of the socket member 10. All of these raceways are in pairs similar to 26 and 28, but this pairing is of only limited significance and will be analyzed later.

Continuing to describe these raceways exactly as they are, the raceway 28 may be said to have a center line axis 30, which axis 30 lies in a plane which includes the center 20 and which plane is at an angle $x$ to an axis 32 of the socket member 10. The raceway 26 has an axis 34 which lies in a plane which also passes through the center 20, but which is inclined to the axis 32 of the socket member 10 in a direction opposite to that of the plane including the axis of the raceway 28, the angle being the same as $x$. The remaining raceways in the socket 10 are formed in exactly the same way, the angle to the axis 32 of the socket member 10 always being $x$.

Completing the physical description of the socket member 10, a cut-out portion 35, referring to Figure 2, is cut in the face of the socket member 10 to a depth such that the radius from the axis 32 is equal to the distance 36, see Figure 7, being the radius of the circumference of the ball sleeve guide 14. A cut-out portion similar to 35 is made in the face of the socket member 10, 180° away from the cut-out portion 35, which is not shown. The width of each of these cut-out portions slightly exceeds the width of the ball sleeve guide 14 in order that the ball sleeve guide may be moved into the socket at right angles to the face of the socket, and once inside, its outer surface 38 being spherical on a radius slightly smaller than the radius of the inner wall 18 of the socket member 10, it may be turned on its axis so as to assume the position shown in Figure 1.

The socket member 10, therefore, comprises a socket having a spherical inner surface which is cut away at a point beyond a plane passed through the center of the spherical surface at right angles to the axis 32 of the socket member 10. The inner spherical surface contains a plurality of raceways which may be described as pairs of raceways inclined to each other. Each raceway may be said to have an axis which constitutes a center for generating the wall of the raceway and which axis is a portion of a circle with the center 20, see Figure 1, of the spherical surface 22 of the socket member 10 as its center. It will be noted that these raceways are inclined toward each other in pairs. The socket also has a means, being cut-out portions such as 35, for inserting into it a ball sleeve guide and the ball member of the joint.

Turning now to the ball member of the joint, in Figure 8 the ball member is generally indicated by the numeral 12 and has hubs 42 and 44 with a splined central opening 46, see Figure 9, adapted to receive the splined end 48, see Figure 1, of a shaft 50. The ball member is seen to be not a complete ball but a double truncated ball having a continuous surface extending around it, which surface is a portion of a sphere. Into this outer surface is cut a plurality of raceways, as, for example, referring to Figure 8, 52 and 54. Referring to Figure 9, in cross section the curvature of each raceway 52 and 54 is identical with the cross section of the raceways 26 and 28, see Figure 5, of the socket member, although the depth of the raceways on the ball member 12 is slightly less, as a matter of fact, than the depth of the raceways in the socket member 10. The raceways 52 and 54 have axes 56 and 58 which lie in planes that intersect a center point 40', which is the center of the spherical surface of the ball member 12. These planes are inclined toward the axis 60 of the ball member 12 by the angle x, which is the same angle of inclination to the axis 60 as exists between the planes, including the axes 34 and 30 of the raceways 26 and 28, see Figures 4 and 5, to the axis 32 of the socket member 10. Additionally, the spacing between the raceways on the ball member 12 may be said to be concentric to the spacing between the raceways on the socket member 10, or expressed differently, a raceway such as 54 on the ball member 12 may be brought into exact registry with the raceway 26 on the socket member 10, it being borne in mind that these two raceways, while inclined differently in the drawing, nevertheless correspond because we are seeing a raceway on the far side of the socket member in Figure 4, while we view raceway 54 on the near side of the ball member 12.

In fact, the ball guide sleeve 14 is positioned between the socket member 10 and the ball member 12, and it is for this reason that a cross section of each raceway, see Figure 9, does not show a curve covering 180° of arc. There is a substantial space between the raceways on the inside of the socket member 10 and the raceways on the ball member 12, the space being approximately equal to the thickness 130 of the ball guide sleeve, see Figure 6. For purposes of explanation, let it be assumed that the spherical surface of the ball member 12 is larger than it is in fact and actually engages smoothly the inside spherical surface of the socket member 10, and that by means of the cut-out portions 35 the ball member 12 is inserted in the socket member 10. By rotating the ball member 12 about its center 40', which is the center 20 of the socket member 10, the raceways on the ball member may be successively exposed outwardly of the socket member 10, to occupy the position shown in Figure 3. If the raceways inclined in the direction of raceway 54 are positioned concentrically with the raceways inclined in the direction of raceway 26, the balls may be dropped into position and may be dropped out just as readily. On the other hand, if the raceway 54 is brought into adjacent position with the raceway 26, there will be only one point of intersection between the raceways which will permit the insertion of a ball. By rocking the ball member 12 around the spherical surface of the socket member 10 it is possible to insert all of the balls in the raceways, and if the ball member 12 is aligned with the socket member 10, the balls will occupy the position shown in Figure 1.

Referring now to Figure 10, there is shown diagrammatically in a plane projection the balls occupying 180° of the surface of the ball member 12. In this figure it is conceived that the raceways on the socket member 10 are nearest the observer, with the raceways on the ball member 12 behind, as is indicated by the respective use of solid and dotted lines. It will be noted that the balls can occupy only one position in each complementary pair of raceways; namely, the central position, because it is in that position only that the two raceways provide sufficient clearance to receive a ball.

The relative position of the ball member 12 and the socket member 10 shown in Figure 1 is not the normal situation intended to be covered by this invention. The more normal situation is that shown in Figure 3, where it is seen that a ball 70 continues to occupy a mid-point in the two complementary raceways, as is shown diagrammatically in Figure 11, whereas a ball 72 has been moved to the right as the point of intersection of the two raceways changes. Similarly with ball 74, which, however, has moved in the opposite direction. The position of all of the remaining balls has correspondingly changed, but it is important to note that all of the balls still lie in a single plane and, referring to Figure 3, this plane, bearing the numeral 76, bisects the angle y between the axis 32 of the socket member 10 and the axis 60 of the ball member 12.

The reason for the bisecting of this angle will be understood by examining Figures 12 and 13, wherein the line 80 depicts one raceway extending from 82 to 84, and the line 86 depicts a second raceway extending from 88 to 90. If the raceway 86 is now moved to the right so that its ends occupy the positions 88' and 90', the distance traveled in a line by the raceway equals the distance 92 which, of course, is identical to the distance 94. The ball, bearing the number 96, however, moves to position 96'. It is very easy to show that the ball moved to the right exactly one-half as far as the raceway 86 moved to the right.

If these movements are now transformed into spherical movements, it is quite clear that if the raceway moves along an arc 98 on a center 100, the number of degrees of arc that the raceway moves with respect to the center 100 will be twice the number of degrees of arc that the ball 96 will move. Hence, it follows that if the intersecting raceways, which may be defined as pairs of intersecting raceways, one raceway being on the inner spherical surface of the socket member 10 and the other being on the external spherical surface of the ball member 12, lie in planes which intersect a center point such as 20 and make with said center point equal and adjacent angles, a movement of one raceway about that center point will move a ball lying at the point of intersection with the complementary raceway just one-half the arc distance that the raceway itself moves.

Figure 13 shows that if the angles are not equal, the distance of arc travel of the ball will not be one-half of the distance of the arc travel of the raceway, with the result that the conditions requisite for constant velocity will not be met. In this figure, 102 represents one raceway and 104 the second raceway. Raceway 102 is inclined at an angle of 45° to the axis 106, while raceway 104 is inclined at an angle of 20°. If the raceway 102 is moved to the right as shown, the ball 108 assumes position 108', and has moved more than half the distance to the right that the raceway 102 has moved. When this is transferred into spherical conceptions it follows that a plurality of balls such as those shown in Figure 3 will not have moved to the position there shown, but will have moved farther, with the result that if the joint would work at all, constant velocity would not result.

The conclusion is drawn that as between a raceway on the socket and the complementary raceway on the ball, their angle of inclination must be opposite so that they intersect, and must be equal so that the rate of arc movement of the ball is always half that of the arc movement of the raceways with respect to each other. The foregoing statement must not be confused to mean that all of the raceways on the socket member 10 must be inclined at the same angle, for such is not the case. The raceway 26 may be inclined at one angle and the raceway 28 at a different angle, for referring to Figure 12 it is not necessary to reach the results above discussed by having the angles between the raceways 45°, for the principles controlling are working over a parallelogram and the fact of the matter is that acute angles such as $x$ are very much more desirable than broader angles. All that is important is that the raceway on the other member of the joint, which in this case is the ball member 12, be inclined at the same angle as the raceway on the socket member 10 with which it will be associated.

The actual angles employed in applicant's invention are very acute in order to assist in the free flowing of the balls at the varying point of intersection between two complementary raceways.

The above discussion assumed that the ball sleeve guide 14 was not disposed between the ball member 12 and the socket member 10 for purposes of simplification. In fact, however, it is necessary to utilize such a ball guide sleeve 14 because on a curving surface, a fact which cannot be seen by examining the plane surfaces in Figures 10 and 11, certain complementary raceways will, at certain points, come into exact registry with each other. There will be two points 180° apart on such a constant velocity joint where such registry of paired raceways will occur. It is, of course, evident that the ball is free to roll to the end of the raceway and if permitted so to do would immediately lock the joint. In order to avoid this, a ball guide sleeve 14 is provided and the principle of its operation is to be compared with that of the external raceway in applicant's copending application. This ball guide sleeve has a plurality of elongated holes 110, equal in number to the balls in the joint. This sleeve is slipped over the ball member 12 and turned to occupy the position shown in Figure 1 with respect to the ball member. The sleeve and the ball member are then inserted into the socket member 10 by means of the cut-out portions 35 and turned to occupy the position shown in Figure 1. The ball member 12 and the sleeve 14 are then turned into some accentuated position indicated by the dotted line 112 and the balls are successively inserted into position. When the balls are in position, it will be observed that the balls such as 114, 72, etc. hold the ball guide sleeve in a selected position while the ball guide sleeve holds whatever ball occupies the position of ball 70, referring to Figure 3, and the ball 180° away, centrally of the two raceways which are in registry. This eliminates all possibility of the ball locking the joint. One further feature should be pointed out; namely, that the ball guide ring has a cut-out portion 120 which, in conjunction with a raceway, makes it possible to insert the ball member 12 inside the ball sleeve guide 14 for assembly purposes.

Speaking generally of the invention, it will be observed that there has been provided in a ball and socket joint a plurality of balls which are positively held in a single orbit which bisects the angle of inclination between the axis of the socket member and the axis of the ball member. It will be observed that this is accomplished by means of intersecting pairs of raceways, one raceway of each pair being on the socket and the other raceway being on the ball. It will be understood that the degree of angularity of these raceways to the axis of the member upon which the raceway is positioned is not important except that the other raceway of the pair must be equally and oppositely inclined. It would be quite possible to have a different angle of inclination for every raceway on the interior wall of the socket. If such a construction were adopted, however, there would have to be a raceway on the ball at exactly the same angle as its paired raceway on the socket.

It will be understood that the selection of 10 balls is purely arbitrary. Four balls might be used and adequate driving means thereby provided. On the other hand, it is believed that a greater number of balls will better distribute the application of torque from one member of the joint to the other member of the joint and will cause less frictional resistance between the raceways and the balls in maintaining the balls in their proper orbital path.

As for the ball guide sleeve member, it will be noted that the openings 110 must be elongated so as to permit the balls to breathe backward and forward during their rotational movement and it will, of course, be appreciated that the length of elongation must be increased if the angle of the raceways to the axis of the member upon which the raceways are mounted is increased.

No importance is deemed to attach to the particular formation of the ball member. The inner wall might be continued as a ball and not cut off as shown in the drawing, nor is any great importance attached to the fact that the socket member is capable of holding a ball member in permanent engagement without the assistance of nuts and bolts and the like. These are considered inventive features of the broad invention, which is the interplay of the balls between intersecting raceways.

It will be noticed that the raceways in the socket are longer than the raceways on the ball. It will be appreciated that the reason for this is that it is necessary to rock the ball member into a greater angle than that shown in Figure 3 in order to remove the ball bearings from the assembly by withdrawing the shaft 50, the ball member 12 may be placed at a further angle so that the bottom ball will occupy the position 110 in which case the ball 72 will occupy the position 112 whereby it may be lifted out of the assembly.

It will further be appreciated that the discussions as to the necessity of equal angularity between the complementary raceways, one on the ball member and one on the socket member, is not to be construed to include raceways which do not lie in a plane which intersects the center of the ball or socket members. Curving intersecting raceways may be devised which may have an action on the balls in holding them in a selected orbit similar to the action provided by these complementary raceways.

Having thus described the invention, what I claim as new and desire to secure by Letters Patent of the United States is:

1. A ball and socket joint having a ball member and a socket member, a plurality of balls disposed in driving relationship between the inner face of the socket and the outer face of the ball, and means for holding said balls in an orbit lying in a plane which always bisects the angle between the axes of the ball and socket members, said means comprising a like plurality of raceways on the inner surface of the socket member, each raceway having an axis lying in a plane at a given angle to the axis of the socket member, and a second like plurality of raceways on the outer surface of the ball member, each latter mentioned raceway being paired with one of the raceways on the socket member and having an axis lying in a plane at the same angle to the axis of the ball member but oppositely inclined to the plane of the paired raceway on the socket member, whereby raceways of each pair intersect with a ball at each point of intersection, some of the raceways on the socket member being oppositely inclined to others at however the same angle between the plane of the raceway and the axis of the socket member with the inclination of the paired raceway on the ball member correspondingly reversed.

2. A ball and socket joint having a ball member and a socket member, a plurality of balls disposed in driving relationship between the inner face of the socket and the outer face of the ball, and means for holding said balls in an orbit lying in a plane which always bisects the angle between the axes of the ball and socket members, said means comprising a like plurality of raceways on the inner surface of the socket member, each raceway having an axis lying in a plane at a given angle to the axis of the socket member, and a second like plurality of raceways on the outer surface of the ball member, each latter mentioned raceway being paired with one of the raceways on the socket member and having an axis lying in a plane at the same angle to the axis of the ball member but oppositely inclined to the plane of the paired raceway on the socket member, whereby raceways of each pair intersect with a ball at each point of intersection, the raceways on the socket member being paired so that each two raceways are oppositely inclined toward each other in planes making the same angle with the axis of the socket member, the raceways on the ball member being similarly paired.

3. In a constant velocity universal joint, male and female torque-transmitting elements cooperatively providing circumferentially spaced pairs of ball raceways extending diagonally in a generally axial direction, the diagonal inclination of one raceway of a given pair being opposite to that of the other raceway, whereby the raceways of each pair are disposed in crossed relationship, a ball located at the crossing of each pair of raceways and received in the respective raceways for transmitting torque between the elements, means embracing the balls and adapted to take the axial thrust developed in the balls by the torque reaction of the crossed raceways against the balls, the diagonal inclination of the raceways of alternate pairs being opposite to that of the intervening pairs whereby such torque reactional thrust is applied alternately to the balls in opposite directions, so that alternate balls will be urged in one direction and the intervening balls will be urged in the opposite direction, thereby balancing the thrust reaction against said thrust-receiving means.

4. In a constant velocity universal joint, male and female torque-transmitting elements cooperatively providing pairs of arcuate ball raceways extending diagonally with reference to meridians of their respective elements with the raceways of each pair having opposite meridional inclination and in crossed relation to each other, a ball disposed at the center of crossing of each pair of raceways and received in the respective raceways for forming a torque-transmitting connection between the elements, and means embracing the balls and arranged to take the axial thrust developed in the balls by the torque reaction of the crossed raceways against the balls, the meridional inclination of the raceways of alternate pairs being opposite to that of the intervening pairs whereby the said axial thrust is directed alternately in opposite directions.

5. A constant velocity universal joint comprising a socket member having a mouth at one side thereof, a truncated ball member having an outside diameter exceeding the diameter of said mouth and socket member, a cut-out in the mouth of the socket member of a width exceeding the width of the truncated ball member whereby the truncated ball member may be inserted into the socket member, and means positioned between the inside surface of the socket member and the outer surface of the truncated ball member for establishing driving relationship therebetween.

WALTER E. AMBERG.